United States Patent Office 3,781,343
Patented Dec. 25, 1973

3,781,343
HYDROLYSIS OF AROMATIC DINITRILES
Richard V. Norton, Wilmington, Del., assignor to Sun Research and Development Co., St. Davids, Pa.
No Drawing. Filed Apr. 12, 1973, Ser. No. 350,433
Int. Cl. C07c 63/00, 63/26
U.S. Cl. 260—515 P                    4 Claims

ABSTRACT OF THE DISCLOSURE

A process for the preparation of an aromatic acid such as terephthalic acid by hydrolysis of terephthalonitrile which comprises subjecting terephthalonitrile to aqueous hydrolysis in a closed reactor at 200° C. to 300° C. until a hydrolysis equilibrium is obtained, venting the closed system to remove more than 50% of available, ammonia, adjusting the venter system to a molality of terephthalate from 1.5 to 2.5, saturating the system with carbon dioxide, and isolating the precipitated terephthalic acid by separation under a pressure of about 50 to about 900 p.s.i.g.

---

It is known in the art to treat aqueous solutions of alkali metal salts of terephthalic acids with carbon dioxide under pressure and to separate the terephthalic acid which precipitates. The alkali metal terephthalates are obtained by the Henkel reaction which involves isomerization of an alkali metal salt (generally potassium) of isophthalic acid or a disproportionation of potassium benzoate. Aqueous solutions of potassium terephthalate so obtained have been treated with $CO_2$ to obtain the free acid. U.S. 3,579,572 describes the precipitation of terephthalic acid by $CO_2$ treatment of a lithium or magnesium salt solution of the acid. A more recent patent (U.S. 3,632,635) describes the $CO_2$ treatment of alkali metal salts of terephthalic acid which are obtained by the hydrolysis of terephthalonitrile in the presence of an alkali metal bicarbonate, this treatment producing the alkali metal monosalt which is subsequently treated to obtain free acid. It is also known from the article by Hajek et al. (Coll. Czechoslov. Chem. Commun. 36, 85, 1971) that when carbon monoxide is introduced into a saturated aqueous solution of diammonium terephthalate at 25° C. the product which precipitates is monoammonium terephthalate.

Terephthalic acid is a well known commodity useful as an intermediate to polyester fibers and when employed for such use it must be of very high purity. The preparation of terephthalic acid by ammoxidation of p-xylene is a useful route, but hydrolysis of the nitrile to pure acid cannot readily be achieved because nitrogen bodies which are hydrolysis intermediates contaminate the final product and these bodies are resistant to removal by solvent extraction or by other conventional techniques.

It has now been found that a very high purity aromatic dicarboxylic acid such as terephthalic acid may be obtained through the ammoxidation-nitrile hydrolysis route, and in accord with the process of this invention, an aromatic dinitrile obtained by ammoxidation is subjected to an aqueous hydrolysis in a closed reactor at a temperature between about 200° C. and about 300° C. until a hydrolysis equilibrium is obtained, venting the closed system to remove more than 50% of available ammonia, adjusting the vented system to a molality of aromatic acid product from about 1.5 to about 2.5, saturating the system with carbon dioxide, and separating the precipitated aromatic acid under pressure of carbon dioxide at about 50 to about 900 p.s.i.g.

As indicated, the process is operable with aromatic dinitriles, particularly those of the benzene and naphthalene series. Thus, for example, operable dinitriles include phthalonitrile, isophthalonitrile, terephthalonitrile, 2,6-dicyanonaphthalene, 1,5-dicyanonaphthalene and the like. The following discussion, however, will use the preferred terephthalonitrile to illustrate the process.

The terephthalonitrile to be hydrolyzed in accord with the invention is fed into a closed hydrolytic chamber where hydrolysis occurs at a temperature between about 200° and 300° C. under autogeneous pressure, the pressure actually rising to about 400 to about 1200 p.s.i.g. In this reactor, the hydrolysis proceeds until an equilibrium is reached which requires about 0.5 to about 3 hours. The hydrolysis products in the equilibrium mixture will consist essentially of the ammonium salt of 4-cyanobenzoic acid, 4-cyanobenzamide, terephthalamide and the ammonium salts of terephthalic and terephthalamic acids. It will be understood that the hydrolysis may be carried out with or without catalysts (e.g., an alkaline material such as alkali, alkaline earth or ammonium hydroxide, carbonates, etc.), but a preferred technique is to use a noncatalytic hydrolysis system. After the equilibrium is established, it is shifted by venting the ammonia formed, and this ammonia is removed, preferably by distillation, together with water vapor. Ammonia is separated until more than 50% of that available is removed as determined by difference from the original amount in the still and the amount of ammonia determined by analysis to be in the distillate stream. Generally about 60% to 80% of total available ammonia is removed, the ammonia being derived from the terephthalonitrile charged as well as intermediates formed during the hydrolysis step. Then the molality of the terephthalic acid is adjusted either by further concentration of the liquid phase or by dilution with water until its molality is from about 1.5 to about 2.5. This molality is readily determined by accounting for the water removed or added to the system whose molality is, of course, known initially. When this has been accomplished the terephthalic acid in the system is in solution or in slurry form and the system is saturated with carbon dioxide by passing the gas in under pressure and the system then allowed to cool from 200° to 300° C. down to 100° to 150° C. Alternatively, the system may be cooled first and then the $CO_2$ added. This causes the terephthalic acid to precipitate and the free acid thus formed is separated at 100° to 150° C. either by filtration, centrifugation or the like while maintaining the system under carbon dioxide pressure of about 50 to about 900 p.s.i.g. It will be understood that the carbon dioxide pressure is not critical as long as sufficient time and agitation are used to ensure $CO_2$ saturation of the nitrile hydrolyzate solution. But it is important to maintain the $CO_2$ pressure on both the filtrate and the separated terephthalic acid during the separation step so as to prevent dissociation of the ammonium carbonate and bicarbonate formed in the filtrate. It will be understood that the filtrate may be recycled to the terephthalonitrile hydrolysis chamber, the $CO_2$ being vented for recovery and reuse for pressuring the system for isolation of the free acid. The separated terephthalic acid is found to be lower in nitrogen-containing products than a comparable hydrolysis procedure where $CO_2$ is not used. In order to further illustrate the invention, the following examples are given:

EXAMPLES

A 2-liter Parr reactor was charged with the appropriate amount of terephthalonitrile in 1.1 liters of water and heated at 280° to 300° C. for 0.33 to 1.0 hour. Then, the reactor was vented and ammonia removed by distillation at 250° C. until the desired amount was removed. The reactor was then closed and pressured at 250° C. with 900 p.s.i.g. of carbon dioxide and the liquid in the system filtered at 100° C. while maintaining $CO_2$ pressure on both the filtrate side and filter cake side of a high pressure filter apparatus. After opening the system to atmospheric pressure, the crude terephthalic acid was removed and dried at 110° C. overnight. The following table indicates the conditions used and the results obtained:

saturating the system with carbon dioxide, isolating the precipitated aromatic dicarboxylic acid by separation under $CO_2$ pressure of about 50 to about 900 p.s.i.g.

TABLE I

Comparison of crude TPA isolated at 100° C. with and without carbonic acid

| | Mole percent $NH_3$, vented [a] | Total percent N [b] | | Percent $NH_4^+$ [c] | |
|---|---|---|---|---|---|
| | | Percent | Δ percent N [d] | Percent N | Δ percent $NH_4$ [d] |
| 2 molal TPN hydrolyzate: | | | | | |
| Without $CO_2$ | 90 | 0.59 | | 0.11 | |
| With $CO_2$ | 90 | 0.08 | −0.51 | 0.00 | −0.41 |
| Without $CO_2$ | 70 | 2.59 | | 1.94 | |
| With $CO_2$ | 70 | 1.85 | −0.74 | 1.15 | −0.79 |
| Without $CO_2$ | 50 | 6.20 | | 4.45 | |
| With $CO_2$ | 50 | 6.28 | +0.08 | 4.75 | +0.30 |
| 1 molal TPN hydrolyzate: | | | | | |
| Without $CO_2$ | 90 | 0.11 | | 0.00 | |
| With $CO_2$ | 90 | 0.10 | −0.01 | 0.00 | 0.00 |
| Without $CO_2$ | 70 | 0.38 | | 0.17 | |
| With $CO_2$ | 70 | 0.50 | +0.12 | 0.25 | +0.08 |
| Without $CO_2$ | 50 | 1.48 | | 0.50 | |
| With $CO_2$ | 50 | 3.27 | +1.79 | 2.46 | +2.0 |

[a] Based on terephthalonitrile charged.
[b] Determined by combustion analysis.
[c] Weight percent nitrogen as $NH_4^+$ determined by potentiometric titration.
[d] Δ percent N=percent N in control less percent N in experiment with $CO_2$ An analysis of the above table shows that at the 2 molal level, the use of $CO_2$ for isolation of TPA results in a product of lower nitrogen when the amount of ammonia vented is above 50%. Venting at 50% actually caused a slight increase in total nitrogen when $CO_2$ was used. The percent of $NH_4^+$ ion in the system is likewise reduced with use of $CO_2$. On the other hand, with a 1 molal system no advantage with $CO_2$ is seen.

As indicated, other aromatic dinitriles may be used in the process and the preferred nitriles are terephthalonitrile, and 2,6-dicyanonaphthalene. In the case of 2,6-dicyanonaphthalene, the process is carried out as described above, except that the molality of the vented system is preferably on the order of 1.5.

The invention claimed is:

1. A process for the preparation of an aromatic dicarboxylic acid which comprises subjecting an aromatic dinitrile of the benzene or naphthalene series to a non-catalytic aqueous hydrolysis in a closed reactor at 200° C. to 300° C. until a hydrolysis equilibrium is obtained, venting the closed system to remove more than 50% of available ammonia, adjusting the vented system to a molality of the aromatic acid product from about 1.5 to about 2.5, saturating the system with carbon dioxide, isolating the precipitated aromatic dicarboxylic acid by separation under $CO_2$ pressure of about 50 to about 900 p.s.i.g.

2. The process of claim 1 where the nitrile is terephthalonitrile.

3. The process of claim 1 where the nitrile is 2,6-dicyanonaphthalene.

4. A process for the preparation of terephthalic acid by hydrolysis of terephthalonitrile which comprises subjecting terephthalonitrile to a non-catalytic aqueous hydrolysis in a closed reactor at 200° C. to 300° C. until a hydrolysis equilibrium is obtained, venting the closed system to remove more than 50% of available ammonia, adjusting the vented system to a molality of terephthalate from about 1.5 to about 2.5, saturating the system with carbon dioxide, and isolating the precipitated terephthalic acid by separation under $CO_2$ pressure of about 50 to about 900 p.s.i.g.

References Cited

FOREIGN PATENTS 428,020   3/1967   Japan _____ 260—515

JAMES A. PATTEN, Primary Examiner